(12) United States Patent
Gim et al.

(10) Patent No.: US 12,474,610 B2
(45) Date of Patent: Nov. 18, 2025

(54) LIGHT MODULATING DEVICE AND AUTOMOBILE

(71) Applicant: LG Chem, Ltd., Seoul (KR)

(72) Inventors: Min Jun Gim, Daejeon (KR); Dong Hyun Oh, Daejeon (KR); Jung Sun You, Daejeon (KR); Jin Hong Kim, Daejeon (KR); Jung Woon Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/006,010

(22) PCT Filed: Jul. 22, 2021

(86) PCT No.: PCT/KR2021/009498
§ 371 (c)(1),
(2) Date: Jan. 19, 2023

(87) PCT Pub. No.: WO2022/019683
PCT Pub. Date: Jan. 27, 2022

(65) Prior Publication Data
US 2024/0036400 A1    Feb. 1, 2024

(30) Foreign Application Priority Data

Jul. 24, 2020 (KR) .................. 10-2020-0092400

(51) Int. Cl.
*G02F 1/13363* (2006.01)
*G02F 1/1333* (2006.01)
(Continued)

(52) U.S. Cl.
CPC .. *G02F 1/133635* (2021.01); *G02F 1/133512* (2013.01); *G02F 1/1337* (2013.01);
(Continued)

(58) Field of Classification Search
CPC .. G02F 1/13725; G02F 1/1393; G02F 1/1396; B60J 3/04
See application file for complete search history.

(56) References Cited

U.S. PATENT DOCUMENTS

2004/0207594 A1   10/2004   Kubo
2004/0240777 A1   12/2004   Woodgate et al.
(Continued)

FOREIGN PATENT DOCUMENTS

CN   110806652 A   *   2/2020   .............. B60J 3/007
JP   2004538529 A       12/2004
(Continued)

OTHER PUBLICATIONS

Extended European Search Report including Written Opinion for Application No. 21846811.4 dated Aug. 25, 2023, pp. 1-8.
(Continued)

*Primary Examiner* — Jessica M Merlin
(74) *Attorney, Agent, or Firm* — Lerner David LLP

(57) ABSTRACT

A light modulating device is disclosed herein. The light modulating device is applied to a sunroof and/or glass of an automobile. In some embodiments, a light modulating device configured to be disposed in a sunroof of an automobile includes a light modulation film layer, wherein the light modulation film layer includes a first anisotropic substrate, a second anisotropic substrate, and a liquid crystal layer, wherein each of the first and second anisotropic substrates has a first surface, wherein the first surfaces of the first and second anisotropic substrates face each other; wherein the liquid crystal layer is disposed between the first surfaces of the first and second anisotropic substrates, and wherein a slow axis of the first or second anisotropic substrate is disposed parallel to a width direction of the automobile.

12 Claims, 8 Drawing Sheets

(51) Int. Cl.
*G02F 1/1335* (2006.01)
*G02F 1/1337* (2006.01)
*G02F 1/137* (2006.01)
*G02F 1/139* (2006.01)

(52) U.S. Cl.
CPC ...... *G02F 1/1397* (2013.01); *G02F 1/133305* (2013.01); *G02F 1/13725* (2013.01); *G02F 1/1393* (2013.01); *G02F 1/1396* (2013.01); *G02F 2413/02* (2013.01)

(56) References Cited

U.S. PATENT DOCUMENTS

| | | | |
|---|---|---|---|
| 2015/0085227 A1* | 3/2015 | Choi | G02F 1/133634 427/508 |
| 2018/0074377 A1 | 3/2018 | You et al. | |
| 2018/0321553 A1 | 11/2018 | Robinson et al. | |
| 2019/0235301 A1 | 8/2019 | Park et al. | |
| 2019/0384094 A1 | 12/2019 | Lee et al. | |
| 2020/0019008 A1 | 1/2020 | Jeon et al. | |
| 2020/0057335 A1 | 2/2020 | Lee et al. | |
| 2021/0018772 A1 | 1/2021 | Kim et al. | |

FOREIGN PATENT DOCUMENTS

| | | | |
|---|---|---|---|
| JP | 2007065316 A | 3/2007 | |
| JP | 2017198750 A | 11/2017 | |
| JP | 2018049260 A | 3/2018 | |
| JP | 2018507443 A | 3/2018 | |
| JP | 2019070780 A | 5/2019 | |
| JP | 2020052276 A | 4/2020 | |
| JP | 6696616 B2 | 5/2020 | |
| JP | 2020518013 A | 6/2020 | |
| KR | 100624586 B1 | 9/2006 | |
| KR | 20150140000 A | 12/2015 | |
| KR | 20160146566 A | 12/2016 | |
| KR | 20180119519 A | 11/2018 | |
| KR | 20180121425 A | 11/2018 | |
| KR | 20190113646 A | 10/2019 | |
| KR | 20200051269 A | 5/2020 | |
| WO | WO-2018199619 A1 * | 11/2018 | ............ G02B 26/02 |
| WO | WO-2019004160 A1 * | 1/2019 | ............ B32B 7/02 |

OTHER PUBLICATIONS

International Search Report for PCT/KR2021/009498 mailed Nov. 3, 2021. 3 pgs.

* cited by examiner

[Figure 1]
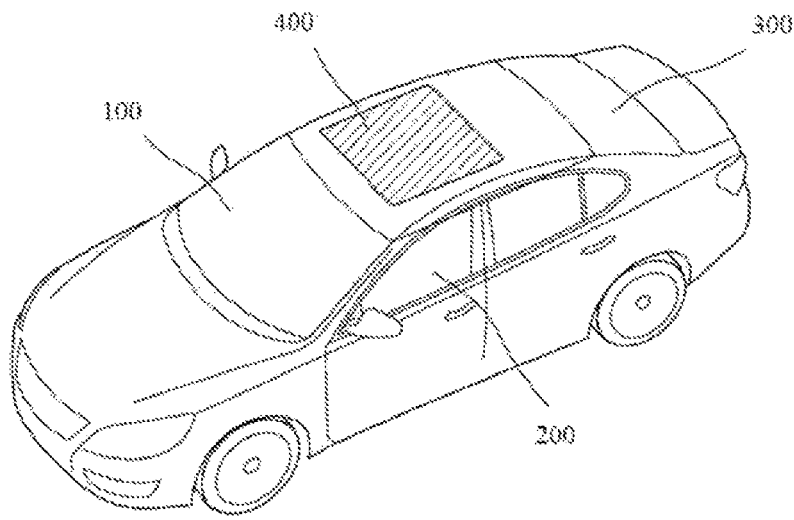
[Figure 2]
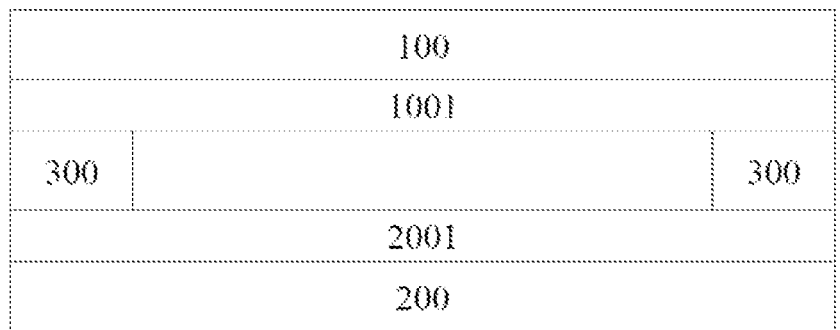
[Figure 3]
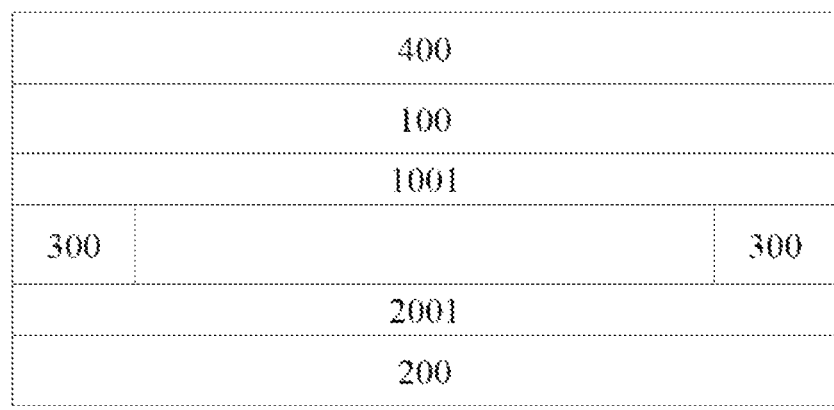

[Figure 4]
| 400 |
| --- |
| 100 |
| 1001 |
| 300 | | 300 |
| 2001 |
| 200 |
| 400 |
[Figure 5]
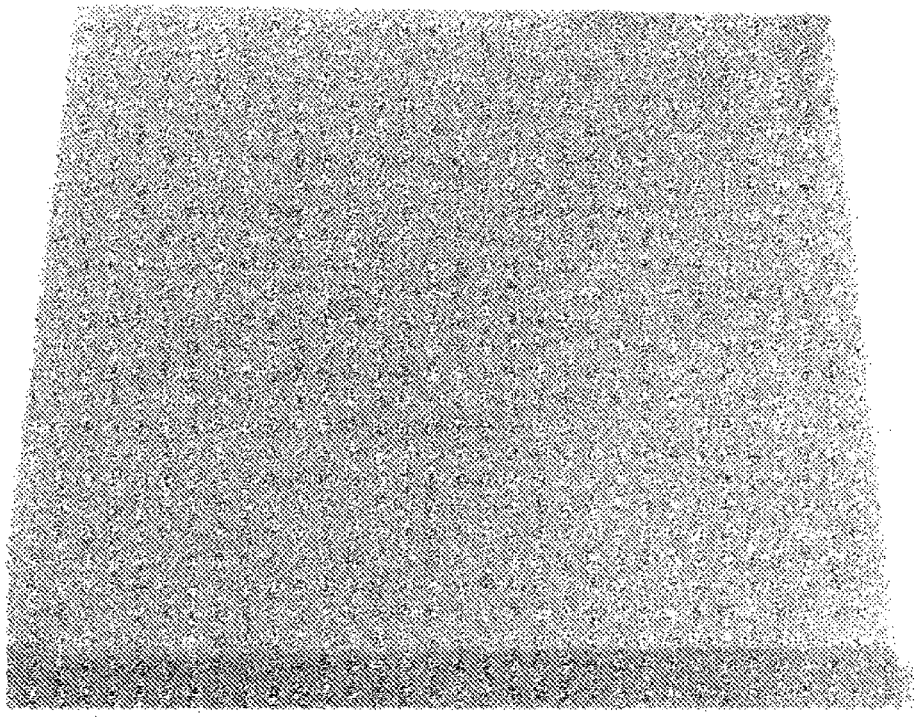

[Figure 6]
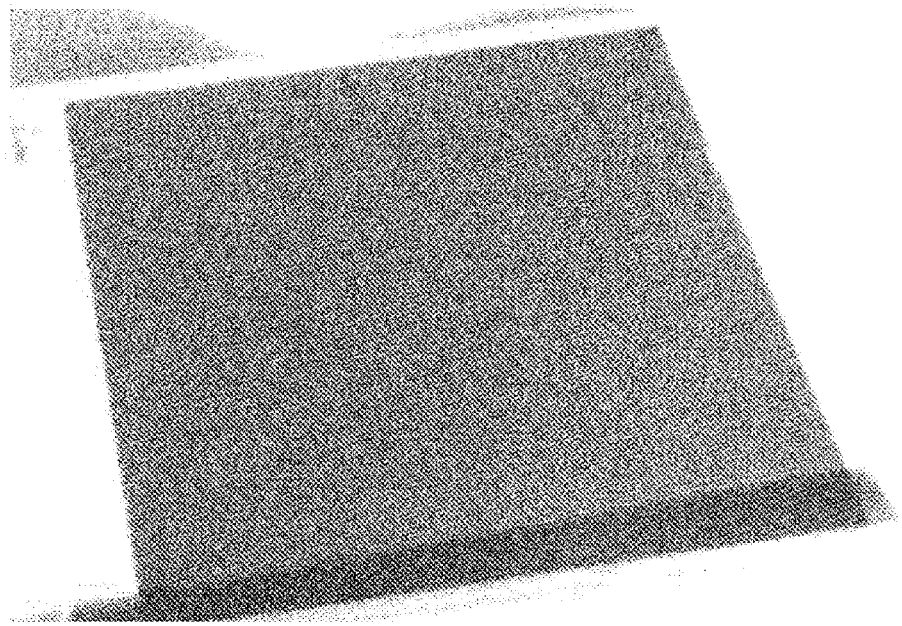
[Figure 7]
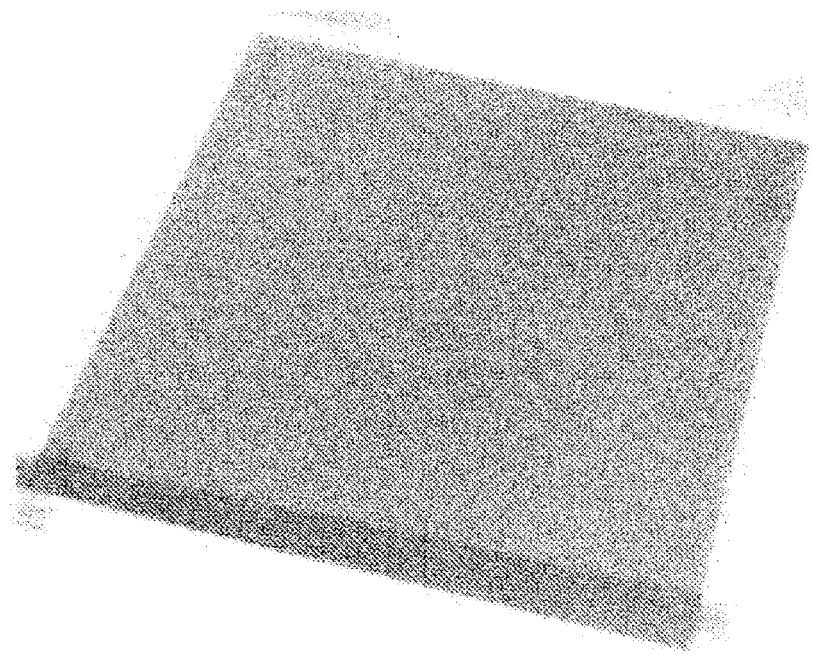

[Figure 8]
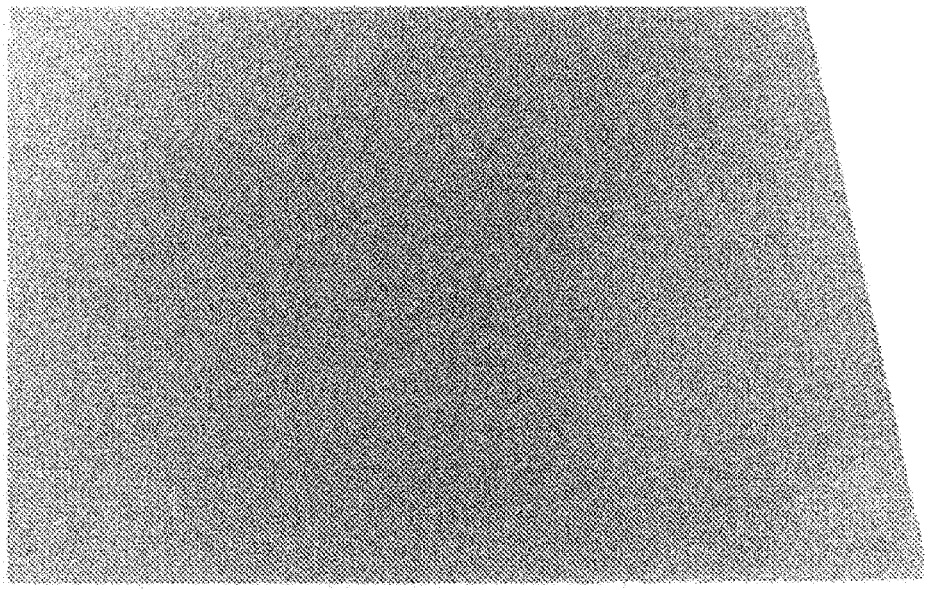
[Figure 9]
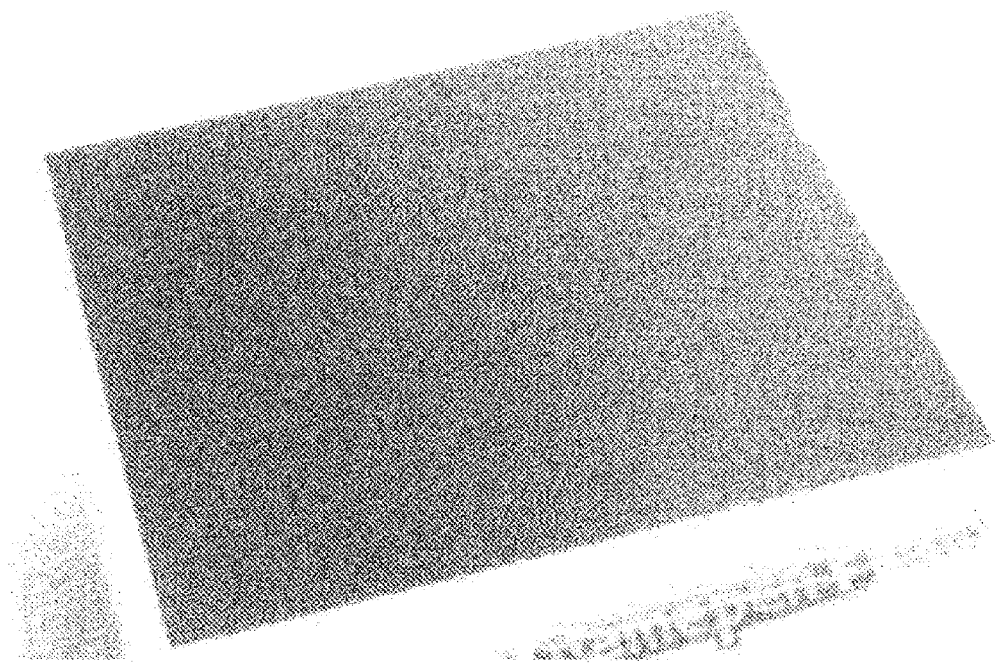

[Figure 10]
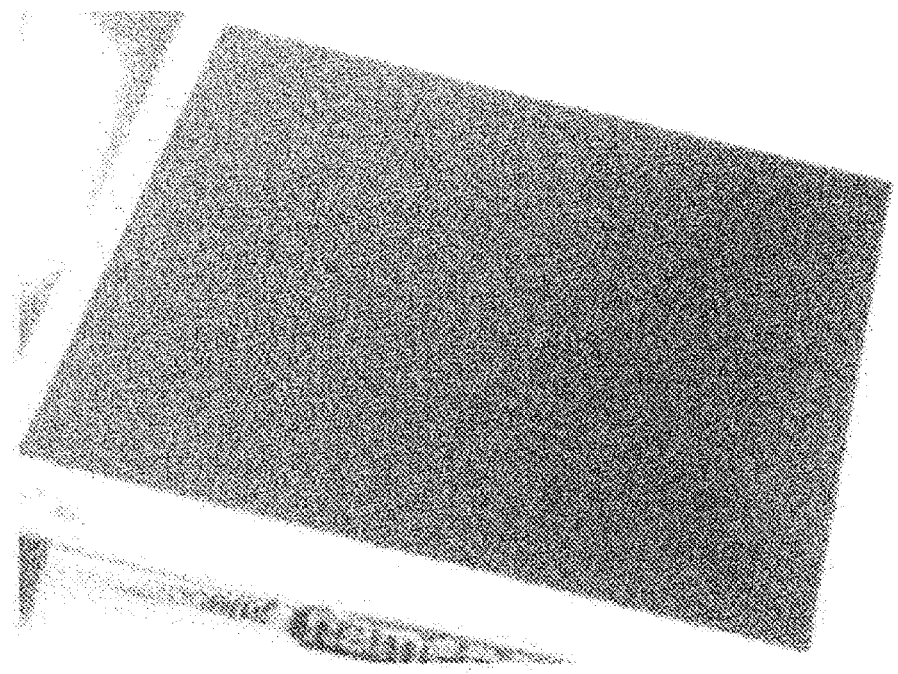
[Figure 11]
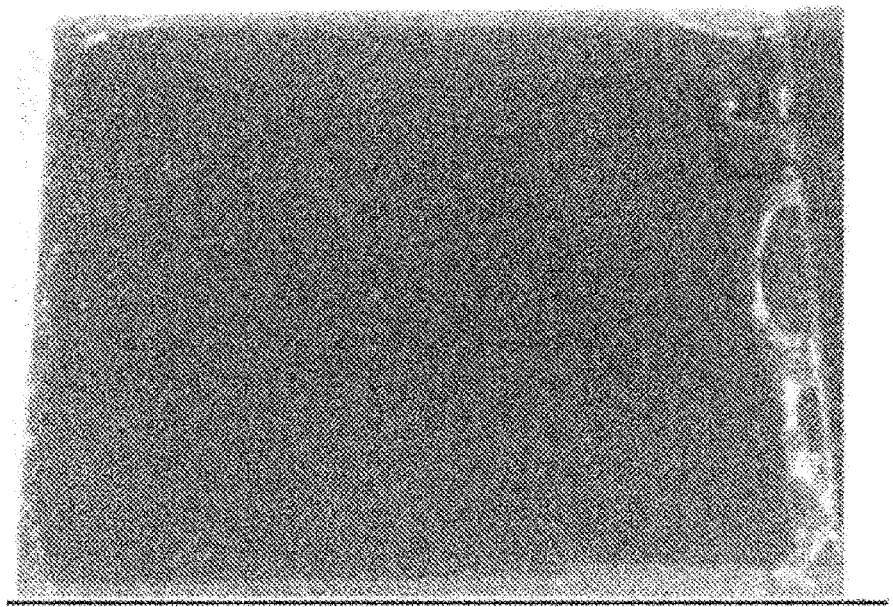

[Figure 12]
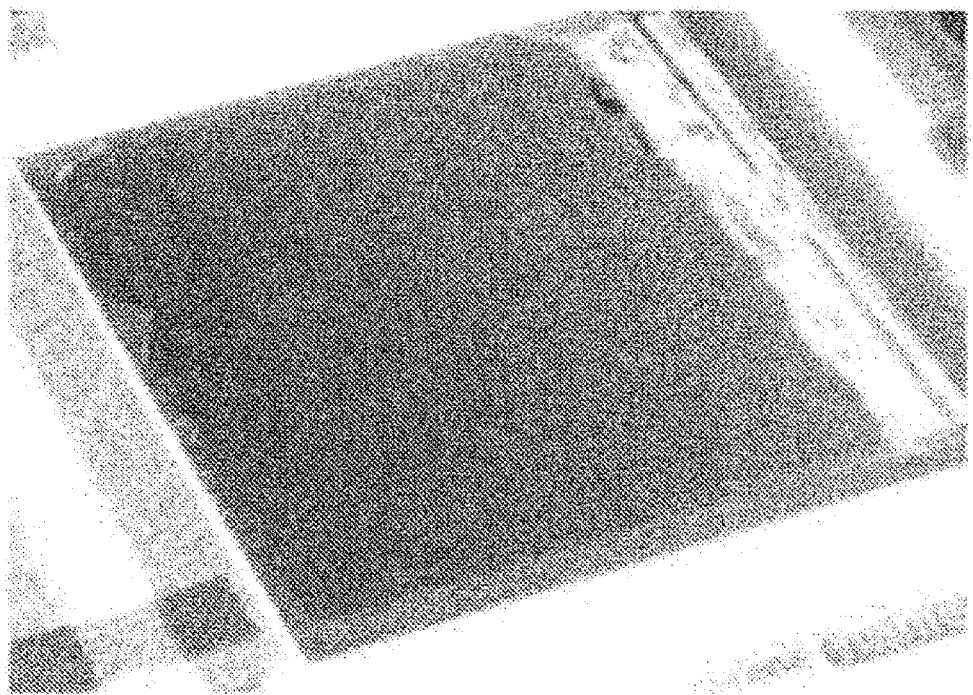
[Figure 13]
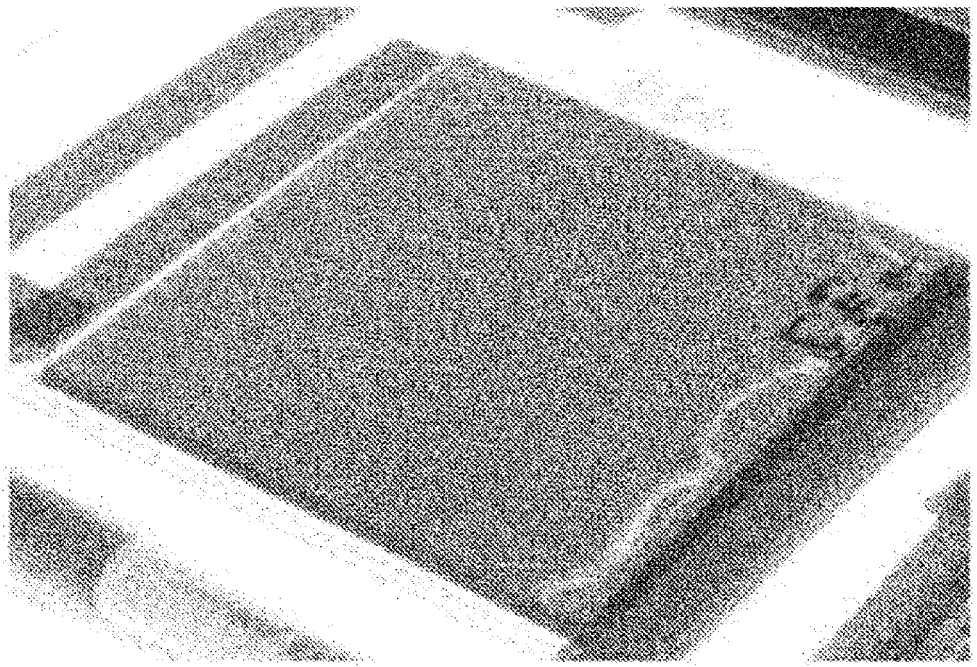

[Figure 14]
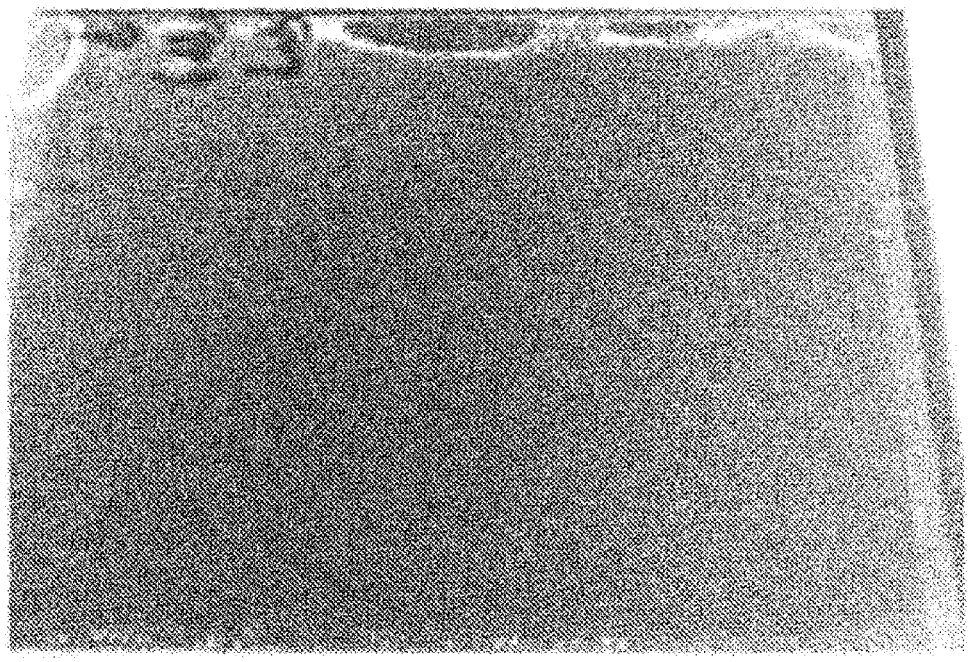
[Figure 15]
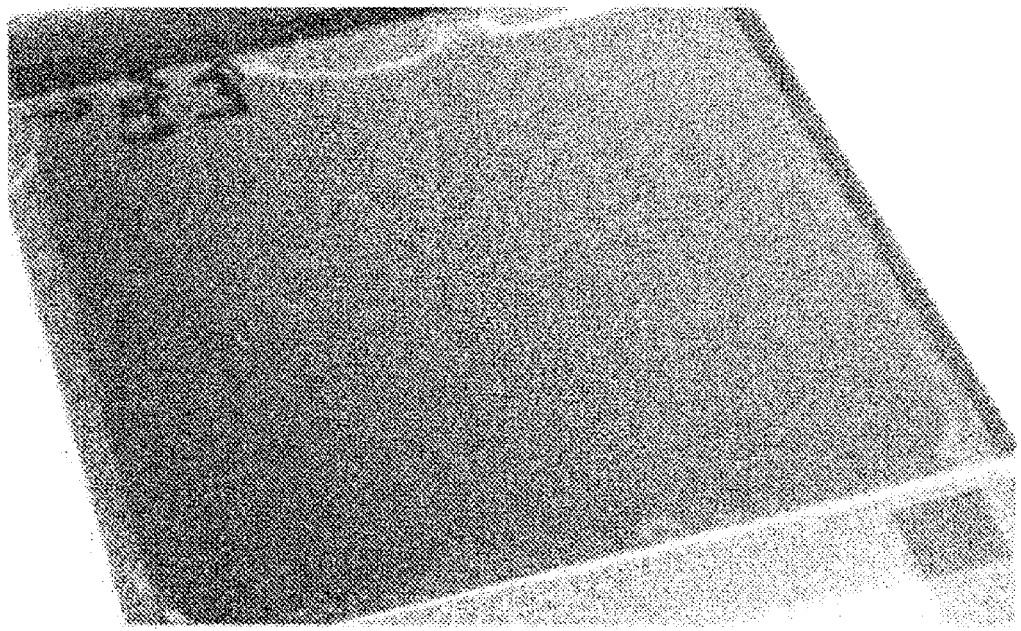

[Figure 16]
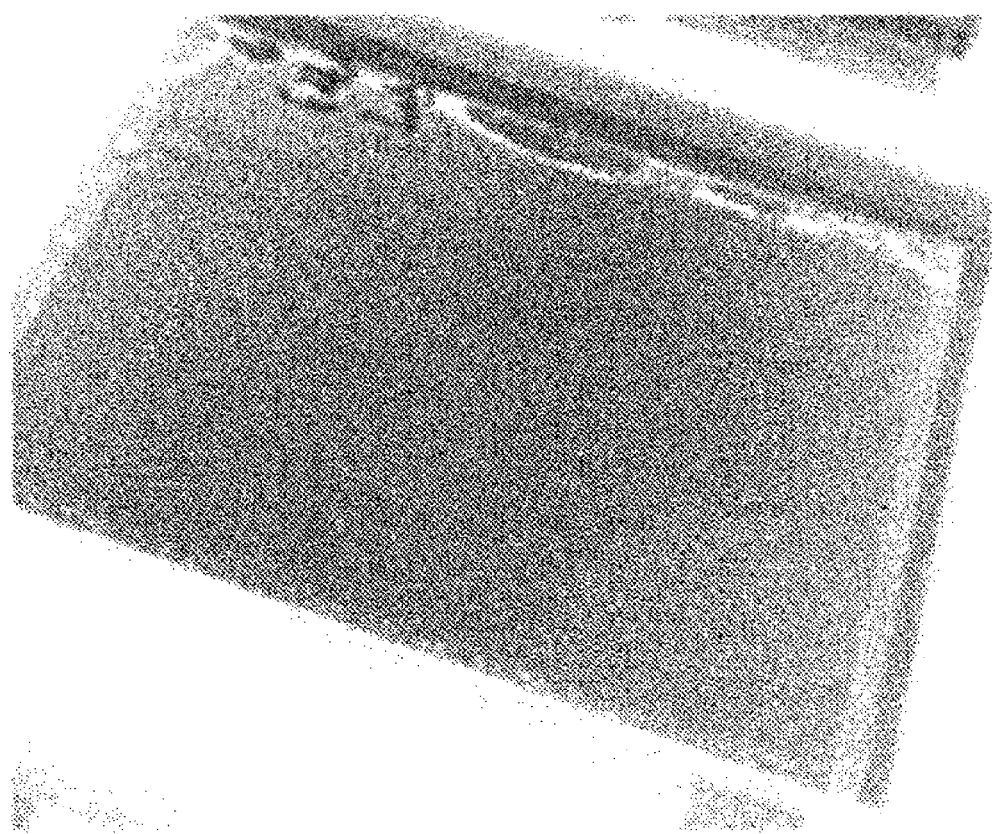

LIGHT MODULATING DEVICE AND AUTOMOBILE

CROSS-REFERENCE TO RELATED APPLICATIONS

This application is a national phase entry under 35 U.S.C. § 371 of International Application No. PCT/KR2021/009498, filed on Jul. 22, 2021, which claims priority from Korean Patent Application No. 10-2020-0092400, filed on Jul. 24, 2020, the disclosures of which are incorporated by reference herein.

TECHNICAL FIELD

The present disclosure relates to a light modulating device and an automobile. The light modulating device may be included in a sunroof or glass of an automobile.

BACKGROUND ART

Through a sunroof or glass mounted on an automobile, a large amount of sunlight enters the vehicle in a season with a high irradiance level of sunlight or in a region with a high irradiance level of sunlight such as a tropical area. Such sunlight causes the temperature increase of the vehicle, and the like.

Accordingly, there is a case where a means capable of blocking sunlight is physically installed on a sunroof or glass during a period with a high irradiance level of sunlight.

However, when the light modulating device as above is applied, there is a problem that non-uniformity of light transmittance occurs according to the viewing angle of a person riding in the vehicle, and accordingly there is a problem that non-uniformity such as a black band occurs depending on the observation direction.

BRIEF DESCRIPTION OF DRAWINGS

FIG. 1 is a view showing an external appearance of an exemplary automobile.

FIGS. 2 to 4 are schematic diagrams of exemplary light modulating devices of the present disclosure.

FIGS. 5 to 16 are photographs showing results of evaluating uniformity of optical properties assuming that a light modulating device is applied to a sunroof or glass of a vehicle.

DISCLOSURE

Technical Problem

The present disclosure relates to a light modulating device and an automobile. Specifically, it is an object to provide, as a light modulating device used as a sunroof, front or rear glass or side glass of an automobile, or included in the sunroof, front or rear glass or side glass, or an automobile in which the light modulating device is included in the sunroof, front or rear glass or side glass, a light modulating device, which is applied to the automobile and designed to enable implementation of uniform transmittance regardless of automobile passengers' visual fields, and an automobile comprising the same.

Technical Solution

In this specification, the term such as vertical, horizontal, orthogonal or parallel among terms defining an angle means substantially vertical, horizontal, orthogonal or parallel in the range without impairing intended effects, and the range of vertical, horizontal, orthogonal or parallel includes an error such as a production error or a deviation (variation). For example, each case of the foregoing may include an error within about ±15 degrees, or an error within about ±14 degrees, an error within about ±13 degrees, an error within about ±12 degrees, an error within about ±11 degrees, an error within about ±10 degrees, an error within about ±9 degrees, an error within about ±8 degrees, an error within about ±7 degrees, an error within about ±6 degrees, an error within about ±5 degrees, an error within about ±4 degrees, an error within about ±3 degrees, an error within about ±2 degrees, an error within about ±1 degree, or an error within about ±0.5 degrees.

Among physical properties mentioned herein, when the measured temperature affects relevant physical properties, the physical properties are physical properties measured at room temperature, unless otherwise specified.

In this specification, the term room temperature is a temperature in a state without particularly warming or cooling, which may mean one temperature in a range of about 10° C. to 30° C., for example, a temperature of about 15° C. or higher. 18° C. or higher, 20° C. or higher, or about 23° C. or higher, and about 27° C. or lower. Unless otherwise specified, the unit of the temperature mentioned herein is ° C.

The phase difference and the refractive index mentioned herein mean a refractive index for light having a wavelength of about 550 nm, unless otherwise specified.

Unless otherwise specified, the angle formed by any two directions, which is mentioned herein, may be an acute angle of acute angles to obtuse angles formed by the two directions, or may be a small angle from angles measured in clockwise and counterclockwise directions. Thus, unless otherwise specified, the angles mentioned herein are positive. However, in order to display the measurement direction between the angles measured in the clockwise direction or the counterclockwise direction if necessary, any one of the angle measured in the clockwise direction and the angle measured in the counterclockwise direction may be represented as a positive number, and the other angle may be represented as a negative number.

The present disclosure relates to a light modulating device applied to a sunroof or glass of an automobile, or included in the sunroof or glass. The present disclosure also relates to an automobile comprising the light modulating device in the sunroof or glass.

Here, as shown in FIG. 1, the glass may be the front glass (100), the side glass (200) or the rear glass (300) of the vehicle. The sunroof or glass may be entirely composed of the light modulating device, or at least a part thereof may be composed of the light modulating device.

In this specification, the term light modulating device may mean a device capable of switching between at least two or more different light states. Here, the different light states may mean states in which at least transmittance, color, and/or haze are different.

An example of the state that the light modulating device can implement includes a transparent, black, high reflection, low-reflection and/or color mode state indicating a specific color and the like, but is not limited thereto.

In one example, the light modulating device may be a device capable of switching between at least the transparent and black mode states, or a device capable of switching between the high reflection and low reflection mode states.

The transmittance of the light modulating device in the transparent mode may be at least 20% or more, 25% or more, 30% or more, 35% or more, 40% or more, 45% or more, 50% or more, 55% or more, 60% or more, 65% or more, 70% or more, 75% or more, or 80% or more or so.

The transmittance of the light modulating device in the black mode state may be 60% or less, 55% or less, 50% or less, 45% or less, 40% or less, 35% or less, 30% or less, 25% or less, 20% or less, 15% or less, 10% or less, 5% or less, 1% or less or 0.5% or less. Since the higher the transmittance in the transparent mode state is, the more advantageous it is and the lower the transmittance in the black mode state is, the more advantageous it is, the upper limit of the transmittance in the transparent mode state and the lower limit of the transmittance in the black mode state are not particularly limited, where in one example, the upper limit of the transmittance in the transparent mode state may be about 100% and the lower limit of the transmittance in the black mode state may be about 0%.

In one example, in the light modulating device capable of switching between the transparent mode state and the black mode state, the difference between the transmittance in the transparent mode state and the transmittance in the black mode state (transparent mode-black mode) may be 15% or more, 20% or more, 25% or more, 30% or more, 35% or more, or 40% or more, or may be 90% or less, 85% or less, 80% or less, 75% or less, 70% or less, 65% or less, 60% or less, 55% or less, 50% or less, or 45% or less.

The transmittance may be linear light transmittance. The linear light transmittance is a percentage of the ratio of the light transmitted in the same direction as the incident direction to the light incident on the device. For example, if the device is in the form of a film or sheet, the percentage of the light transmitted through the device in the direction parallel to the normal direction among incident light in a direction parallel to the normal direction of the film or sheet surface may be defined as the transmittance.

The transmittance may be each transmittance for any one wavelength in the visible light region, for example, any one wavelength in a range of about 400 to 700 nm or about 380 to 780 nm, or transmittance for the entire visible light region, maximum or minimum transmittance among the transmittance for the entire visible light region, or an average value of the transmittance in the visible region.

The light modulating device of the present disclosure may be designed to switch between at least two or more states of any one state selected from the transparent mode, black mode and color mode states, and another state. If necessary, other third different states or higher states rather than the above states may also be implemented.

The switching of the light modulating device may be controlled depending on whether or not an external signal, for example, a voltage signal is applied. For example, in a state of not applying an external signal such as a voltage, the light modulating device may maintain any one of the above-described states, and then may be switched to another state when a voltage is applied. The state of the mode may be changed or the third different mode state may also be implemented, by changing the intensity, frequency and/or shape of the applied voltage.

Therefore, the automobile of the present disclosure may further comprise a control circuit capable of switching the light modulating device or an external signal applying means, and the like. A method of configuring such additional means is not particularly limited, and known means may be appropriately applied.

The light modulating device of the present disclosure may comprise, as a basic unit, a light modulation film layer having two substrates disposed opposite to each other and a light modulation layer positioned between the substrates. FIG. 2 is a diagram showing one example of the light modulation film layer. As shown in the drawing, the light modulation film layer may comprise a first substrate (100) and a second substrate (200) which are oppositely disposed. Typically, the first substrate (100) and the second substrate (200) are attached by a sealant (300).

A functional layer (1001) is formed on one surface (hereinafter, may be referred to as a first surface) of the first substrate (100), a liquid crystal alignment film (2001) is formed on one surface (hereinafter, may be referred to as a first surface) of the other second substrate (200), and a light modulation layer is positioned between the first substrate (100) and the second substrate (200) disposed opposite to each other. When the light modulation layer is a liquid crystal layer, the liquid crystal alignment film is typically formed on both surfaces of the first and second substrates (100, 200). Therefore, the functional layer (1001) formed on the first surface of the first substrate (100) may also be the liquid crystal alignment film. In another example, the functional layer (1001) may be a pressure-sensitive adhesive layer or an adhesive layer. The present inventors have confirmed that even when an appropriate pressure-sensitive adhesive layer or adhesive layer, not a liquid crystal alignment film, as the functional layer (1001) of the first substrate (100) is formed, liquid crystal orientation suitable for vehicles is achieved. In addition, although not shown in the drawing, in any one of the first and second substrates of the light modulation film layer, a spacer for maintaining an interval (cell gap) between the first and second substrates may be present. When the pressure-sensitive adhesive layer or adhesive layer as the functional layer (1001) is formed on the first substrate (100), the pressure-sensitive adhesive layer or adhesive layer (1001) is attached to the spacer, thereby being capable of greatly improving lamination force between the first and second substrates.

In this specification, the first surface of the substrate means any one surface of the main surface of the substrate and the opposite surface, and the second surface means the other surface of the main surface of the substrate and the opposite surface.

As the substrate, a known substrate material may be used without any particular limitation. For example, an isotropic substrate or an anisotropic substrate may be used as the substrate. The term isotropic substrate means a substrate whose refractive index does not depend on the polarization direction of a wave, and the anisotropic substrate means a substrate whose refractive index varies depending on the polarization state of light. As the substrate, an inorganic substrate such as a glass substrate, a crystalline or amorphous silicon substrate or a quartz substrate, or a plastic substrate may be used. As the plastic substrate, a TAC (triacetyl cellulose) substrate; a COP (cycloolefin copolymer) substrate such as a norbornene derivative substrate; a PMMA (poly(methyl methacrylate)) substrate; a PC (polycarbonate) substrate; a PE (polyethylene) substrate; a PP (polypropylene) substrate; a PVA (polyvinyl alcohol) substrate; a DAC (diacetyl cellulose) substrate; a Pac (polyacrylate) substrate; a PES (poly ether sulfone) substrate; a PEEK (polyetheretherketon) substrate; a PPS (polyphenylsulfone), a PEI (polyetherimide) substrate; a PEN (polyethylenenaphthatlate) substrate; a polyester substrate such as a PET (polyethyleneterephtalate) substrate; a PI (polyimide) substrate; a PSF (polysulfone) substrate; a PAR (polyarylate) substrate or a substrate comprising an amorphous fluororesin or the like may be used, without being limited thereto. The thickness of such a substrate is not particularly limited, which may be selected within an appropriate range.

In the present disclosure, among such substrates, an anisotropic substrate may be applied in terms of securing mechanical properties, flexibility, and optical properties suitable for vehicles, and specifically, an anisotropic plastic substrate may be applied. Such a substrate can provide mechanical properties, flexibility, and optical properties suitable for a light modulating device for a vehicle due to its inherent properties.

Among the anisotropic plastic substrates, a substrate having optical anisotropy in a certain level or more may exhibit mechanical properties and flexibility particularly suitable for vehicles. For example, in the present disclosure, as the substrate, a plastic substrate having an in-plane phase difference of at least 400 nm or more may be applied.

In this specification, the in-plane phase difference (Rin) means a value calculated by Equation 1 below.

$$Rin = d \times (nx - ny) \quad \text{[Equation 1]}$$

In Equation 1, Rin is the in-plane phase difference, d is the thickness of the substrate, nx is the refractive index of the substrate in the slow axis direction, ny is the refractive index of the substrate in the fast axis direction, which is the refractive index in the in-plane direction orthogonal to the slow axis direction.

In another example, the in-plane phase difference may be 400 nm or more, 450 nm or more, 550 nm or more, 600 nm or more, 650 nm or more, 700 nm or more, 750 nm or more, 800 nm or more, 850 nm or more, 900 nm or more, 950 nm or more, 1000 nm or more, 2000 nm or more, 3000 nm or more, 4,000 nm or more, 5,000 nm or more, 6,000 nm or more, 7,000 nm or more, 8,000 nm or more, 9,000 nm or more, 10,000 nm or more, 11,000 nm or more, 12,000 nm or more, 13,000 nm or more, 14,000 nm or more, or 15,000 nm or more or so. In addition, the in-plane phase difference of each of the substrates may be about 50,000 nm or less, about 40,000 nm or less, about 30,000 nm or less, 20,000 nm or less, 18,000 nm or less, 16,000 nm or less, 15,000 nm or less, or 12,000 nm or less or so.

As the plastic substrate having the phase difference, a polyester film substrate such as a PET (poly(ethylene terephthalate)) substrate is typically known, but the type of substrate that can be applied in the present disclosure is not limited thereto, and all the various type substrates can be applied as long as they have such an in-plane phase difference. In addition, at least two substrates applied to the light modulation film layer may all have such an in-plane phase difference, but at least one substrate may have such an in-plane phase difference.

The substrate having this anisotropy exhibits mechanical properties, flexibility, and optical properties suitable for vehicles, but due to the inherent optical anisotropy of the relevant substrate, when applied to a vehicle, it can provide optical non-uniformity depending on passengers' visual fields. However, the light modulating device designed according to the present disclosure can improve or eliminate disadvantages while taking advantages of the substrate.

For example, when the light modulating device is applied to a sunroof of an automobile or included in the sunroof, the slow axis of the first and/or second anisotropic substrate may be formed to be parallel to the width direction of the automobile. At this time, the fact that the slow axis is formed to be parallel to the width direction of the automobile may mean that, for example, in the case where a fastening means or a fastening portion that can be mounted at a sunroof position of the automobile is present in the light modulating device, when the light modulating device is mounted at the sunroof position using the fastening means or fastening portion, the fastening means or the fastening portion is present so that the slow axis of the substrate is disposed to be parallel to the width direction of the automobile. In another example, it may mean that if the shape of the light modulating device is configured to have the same shape as the shape of the sunroof of the automobile and the light modulating device is mounted on the sunroof of the automobile according to the shape, the shape of the light modulating device is manufactured so that the slow axis of the substrate is disposed parallel to the width direction of the automobile.

Therefore, in one example, a fastening means or a fastening portion that can be mounted to the sunroof of the automobile is present in the light modulating device or the light modulating device has the same shape as the sunroof, and the fastening means, fastening portion or shape may be determined so that when the light modulating device is mounted on the sunroof of the automobile according to the fastening means, fastening portion or shape, the slow axis of the first or second anisotropic substrate is disposed parallel to the width direction of the automobile.

A method of forming the fastening means or fastening portion as above on the light modulating device or configuring the light modulating device to have the above shape is not particularly limited, and a known method may be applied.

For example, when the light modulating device is applied to front, rear or side glass of an automobile, or included in the front, rear or side glass, the slow axis of the first and/or second anisotropic substrate may be formed to be disposed parallel to the longitudinal direction of the automobile. At this time, the fact that the slow axis is formed to be disposed parallel to the longitudinal direction of the automobile may mean that, for example, in the case where a fastening means or a fastening portion that can be mounted to the light modulating device at a position on the front, rear or side glass of the automobile is present in the light modulating device, when the light modulating device is mounted at the front, rear or side glass position using the fastening means or fastening portion, the fastening means or the fastening portion is present so that the slow axis of the substrate is disposed parallel to the longitudinal direction of the automobile. In another example, it may mean that if the shape of the light modulating device is configured to have the same shape as the shape of the front or rear or side glass of the automobile and the light modulating device is mounted as the front, rear or side glass of the automobile according to the shape, the shape of the light modulating device is manufactured so that the slow axis of the substrate is disposed parallel to the longitudinal direction of the automobile.

Therefore, in one example, a fastening means or a fastening portion that can be mounted on the front, rear or side glass of the automobile is present in the light modulating device or the light modulating device has the same shape as the front, rear or side glass, the fastening means, fastening portion or shape may be determined so that when the light modulating device is mounted on the front, rear, or side glass of the vehicle according to the fastening means, fastening portion or shape, the slow axis of the first or second anisotropic substrate is disposed parallel to the longitudinal direction of the automobile.

A method of forming the fastening means or fastening portion as above on the light modulating device or configuring the light modulating device to have the above shape is not particularly limited, and a known method may be applied.

For example, when both anisotropic substrates are applied as two substrates (e.g., the first and second substrates (100, 200) in FIG. 2) in the light modulation film layer of the present disclosure, the two substrates (the first and second substrates) are suitably arranged so that their optical axes are parallel to each other. In this specification, the optical axis of the anisotropic substrate means the slow axis of the anisotropic substrate, unless otherwise specified, and the optical axis of the polarization layer means the absorption axis of the polarization layer, unless otherwise specified. The absorption axis of the polarization layer and the slow axis of the first or second anisotropic substrate are perpendicular or horizontal to each other.

In the light modulation film layer, the light modulation layer present between the substrates is a functional layer capable of changing light transmittance, reflectivity, haze and/or color, etc. of the light modulating device, alone or in connection with other components, depending on whether or not an external signal is applied. Such a light modulation layer may be referred to as an active light modulation layer herein.

In this specification, the external signal may mean an external factor, for example, an external voltage or the like, which may affect the behavior of a material included in the light modulation layer, for example, a light modulation material. Therefore, a state without any external signal may mean a state without the application of an external voltage or the like.

In the present disclosure, the type of the light modulation layer is not particularly limited as long as it has the above-described functions, and a known light modulation layer can be applied. The light modulation layer may be, for example, a liquid crystal layer, an electrochromic material layer, a photochromic material layer, an electrophoretic material layer, or a dispersed particle orientation layer.

In one example, the liquid crystal layer may be applied as the light modulation layer. The liquid crystal layer is a layer containing a liquid crystal compound. In this specification, the range of the term liquid crystal layer includes all layers containing a liquid crystal compound, and for example, as described below, a so-called guest host layer comprising a liquid crystal compound (liquid crystal host) and a dichroic dye, or a layer comprising other additives such as a chiral dopant together with a liquid crystal compound is also a kind of liquid crystal layer defined in this specification. The liquid crystal layer may be an active liquid crystal layer, and thus the liquid crystal compound may exist in the liquid crystal layer such that the orientation direction changes depending on whether or not an external signal is applied. As the liquid crystal compound, any kind of liquid crystal compound can be used as far as the orientation direction can be changed by application of an external signal. For example, a smectic liquid crystal compound, a nematic liquid crystal compound or a cholesteric liquid crystal compound can be used as the liquid crystal compound. Furthermore, the liquid crystal compound may be, for example, a compound which has no polymerizable group or crosslinkable group so that the orientation direction can be changed by application of an external signal.

The liquid crystal layer may comprise a liquid crystal compound whose dielectric constant anisotropy is positive or negative. The absolute value of the dielectric constant anisotropy of the liquid crystal can be appropriately selected in consideration of the object of the present disclosure. The term dielectric constant anisotropy ($\Delta\varepsilon$) may mean a difference ($\varepsilon// - \varepsilon\perp$) between the horizontal dielectric permittivity ($\varepsilon//$) and the vertical permittivity ($\varepsilon\backslash/$) of the liquid crystal. In this specification, the term horizontal permittivity ($\varepsilon//$) means a dielectric constant value measured along the direction of an electric field in a state where a voltage is applied so that the director of the liquid crystal and the direction of the electric field by the applied voltage are substantially horizontal, and the vertical permittivity ($\varepsilon\perp$) means a dielectric constant value measured along the direction of an electric field in a state where a voltage is applied so that the director of the liquid crystal and the direction of the electric field by the applied voltage are substantially perpendicular.

The driving mode of the liquid crystal layer may be exemplified by, for example, a DS (dynamic scattering) mode, an ECB (electrically controllable birefringence) mode, an IPS (in-plane switching) mode, an FFS (fringe-field switching) mode, an OCB (optically compensated bend) mode, a VA (vertical alignment) mode, an MVA (multi-domain vertical alignment) mode, a PVA (patterned vertical alignment) mode, an HAN (hybrid aligned nematic) mode, a TN (twisted nematic) mode, an STN (super twisted nematic) mode or R-TN (reversed twisted nematic) mode, and the like.

The light modulation layer, which is a liquid crystal layer, may further comprise a dichroic dye in terms of controlling light transmittance-variable characteristics together with the liquid crystal compound, if necessary. For example, when the light modulating device comprises one layered polarization layer, the light modulation layer, which is the liquid crystal layer, may further comprise the dichroic dye. In this specification, the term "dye" may mean a material capable of intensively absorbing and/or deforming light in at least a part or all of the ranges within a visible light region, for example, within a wavelength range of 400 nm to 700 nm, and the term "dichroic dye" may mean a material capable of anisotropic absorption of light in at least a part or all of the ranges of the visible light region. Such a dye is known, for example, as an azo dye or an anthraquinone dye, and the like, but is not limited thereto.

In one example, for example, when the light modulating device comprises one layered polarization layer, the light modulation layer is a liquid crystal layer comprising a liquid crystal compound and a dichroic dye, which may be a so-called guest host liquid crystal layer (guest host liquid crystal cell). The term "GHLC layer" may mean a functional layer that dichroic dyes are arranged together depending on arrangement of liquid crystals to exhibit anisotropic light absorption characteristics with respect to an alignment direction of the dichroic dyes and the direction perpendicular to the alignment direction, respectively. For example, the dichroic dye is a substance whose absorption rate of light varies with a polarization direction, where if the absorption rate of light polarized in the long axis direction is large, it may be referred to as a p-type dye, and if the absorption rate of polarized light in the short axis direction is large, it may be referred to as an n-type dye. In one example, when a p-type dye is used, the polarized light vibrating in the long axis direction of the dye may be absorbed and the polarized light vibrating in the short axis direction of the dye may be less absorbed to be transmitted. Hereinafter, unless otherwise specified, the dichroic dye is assumed to be a p-type dye.

The light modulation film layer comprising the guest host liquid crystal layer as the light modulation layer may function as an active polarization layer (active polarizer). In this specification, the term "active polarization layer (active polarizer)" may mean a functional element capable of controlling anisotropic light absorption depending on external signal application. Such an active polarization layer can be distinguished from a passive polarization layer, which is described below, having constant light absorption or light reflection characteristics regardless of the external signal application. The guest host liquid crystal layer can control the anisotropic light absorption for the polarized light in the direction parallel to the arrangement direction of dichroic dyes and the polarized light in the vertical direction by controlling the arrangement of liquid crystals and dichroic dyes. Since the arrangement of liquid crystals and dichroic dyes can be controlled by the application of the external signal such as a magnetic field or an electric field, the guest host liquid crystal layer can control anisotropic light absorption depending on the external signal application.

The liquid crystal layer, which is a light modulation layer, may also comprise a so-called chiral dopant together with the liquid crystal compound. Such a chiral dopant may induce orientation of a helical structure in the liquid crystal compound.

The chiral dopant may be used without any particular limitation, as long as it can induce a desired twisting without impairing liquid crystallinity such as nematic regularity. The chiral dopant for inducing rotation in the liquid crystal molecules needs to include at least chirality in the molecular structure. The chiral dopant may be exemplified by, for example, a compound having one or two or more asymmetric carbons, a compound having an asymmetric point on a heteroatom, such as a chiral amine or a chiral sulfoxide, or a compound having axially asymmetric and optically active sites such as cumulene or binaphthol. The chiral dopant may be, for example, a low molecular weight compound having a molecular weight of 1,500 or less. As the chiral dopant, commercially available chiral nematic liquid crystals, and the like may be applied.

Also, the ratio of the chiral dopant is not particularly limited, but the chiral dopant may be included in a ratio that the ratio (d/p) of the thickness (d, cell gap) of the light modulation layer and the pitch (p) of the helical structure of the liquid crystal compound generated by the addition of the chiral dopant may be 0.05 or more, 0.1 or more, 0.15 or more, 0.2 or more, 0.25 or more, 0.3 or more, 0.35 or more, 0.4 or more or so, 0.45 or more or so, 0.5 or more or so, 0.55 or more or so, 0.6 or more or so, 0.65 or more or so, 0.7 or more or so, 0.75 or more or so, or 0.8 or more or so. Such a ratio (d/p) is linked to the orientation of the liquid crystal compound induced by the pressure-sensitive adhesive layer or adhesive layer and the liquid crystal alignment film, so that an orientation state suitable for the applied use can be derived. In addition, as the ratio (d/p) is higher, the light modulating device can more efficiently implement transparent and black states, and in particular, a device in which transmittance is effectively suppressed in the black state can be implemented. However, if an excessive amount of a chiral dopant is added to increase the ratio (d/p), there is a problem that orientation stability, particularly orientation stability according to temperature change, or orientation stability at high temperature is lowered. However, when two chiral dopants are applied according to the present disclosure, as described below, excellent orientation stability can be ensured even in a state where the ratio (d/p) is maintained high. In another example, the ratio (d/p) may be 2 or less, 1.5 or less, 1 or less, less than 1, 0.95 or less, 0.9 or less, or 0.85 or less.

The pitch (p) of the light modulation layer (liquid crystal layer) in the so-called twisted or cholesteric orientation mode to which the chiral dopant is applied can be measured by a measurement method using a wedge cell, and can be measured by a method described in D. Podolskyy et al. Simple method for accurate measurements of the cholesteric pitch using a stripe-wedge Grandjean-Cano cell (Liquid Crystals, Vol. 35, No. 7, July 8\2008, 789-791). In addition, the content (weight %) of the chiral dopant is calculated by the equation of 100/(HTP (helical twisting power) X pitch (nm)), which may be selected at an appropriate ratio in consideration of the desired pitch (p).

The type of the above additional components (e.g., dichroic dye or chiral dopant, etc.) included in the light modulation layer together with the liquid crystal compound is not particularly limited, where known components may be used and the light modulation layer may further comprise required known components in addition to the above components.

The type of liquid crystal alignment film that can be formed on the first surface of the first and/or second substrate in the light modulation film layer is not particularly limited. As the liquid crystal alignment film, a known vertical or horizontal alignment film or other alignment films may be applied in consideration of desired initial orientation. As for the type of the alignment film, a contact alignment film such as a rubbing alignment film or a non-contact alignment film such as a photo alignment film may be applied.

The type of the pressure-sensitive adhesive layer or the adhesive layer that can be applied as a functional layer to the surface of the first substrate is not particularly limited. For example, it has been confirmed that various types of pressure-sensitive adhesives or adhesives known as a so-called OCA (optically clear adhesive) or OCR (optically clear resin) in the industry may induce suitable orientation of the liquid crystal compound in combination with the liquid crystal alignment film. As the pressure-sensitive adhesive or adhesive, for example, an acrylic, silicone-based, epoxy-based, or urethane-based pressure-sensitive adhesive or adhesive may be applied.

As the suitable pressure-sensitive adhesive or adhesive, a silicone-based pressure-sensitive adhesive or adhesive may be exemplified. The specific surface characteristics of the silicone-based pressure-sensitive adhesive or adhesive may induce the orientation state of the liquid crystal compound suitable for the purpose in combination with the liquid crystal alignment film (especially, vertical alignment film).

As the silicone-based pressure-sensitive adhesive or adhesive, a cured product of a curable silicone adhesive or pressure-sensitive adhesive composition (hereinafter, may be simply referred to as a curable silicone composition) may be used. The type of curable silicone composition is not particularly limited, and for example, a heat-curable silicone composition or an ultraviolet-curable silicone composition may be used.

In one example, the curable silicone composition is an addition-curable silicone composition, which may comprise (1) an organopolysiloxane containing two or more alkenyl groups in the molecule, and (2) an organopolysiloxane containing two or more silicon-bonded hydrogen atoms in the molecule. Such a silicone compound may form a cured product by an addition reaction, for example, in the presence of a catalyst such as a platinum catalyst.

The (1) organopolysiloxane comprises, as a main component constituting the silicone cured product, at least two alkenyl groups in one molecule. At this time, a specific example of the alkenyl group includes a vinyl group, an allyl group, a butenyl group, a pentenyl group, a hexenyl group or a heptenyl group, and the like, and a vinyl group of the foregoing is usually applied, but is not limited thereto. In the (1) organopolysiloxane, the bonding position of the alkenyl group as described above is not particularly limited. For example, the alkenyl group may be bonded to the end of the molecular chain and/or to the side chain of the molecular chain. In addition, in the (1) organopolysiloxane, the type of the substituent that may be included in addition to the above-described alkenyl may include an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group or a 3,3,3-trifluoropropyl group, and the like, and a methyl group or a phenyl group of the foregoing is usually applied, but is not limited thereto.

The molecular structure of the (1) organopolysiloxane is not particularly limited, which may also have any shape, such as linear, branched, cyclic, reticulated or linear with partially branched. One having a linear molecular structure among such molecular structures is usually applied, but is not limited thereto.

A more specific example of the (1) organopolysiloxane may include a dimethylsiloxane-methylvinylsiloxane copolymer blocking with trimethylsiloxane groups at both ends of the molecular chain, a methylvinylpolysiloxane blocking with trimethylsiloxane groups at both ends of the molecular chain, a dimethylsiloxane-methylvinylsiloxane-methylphenylsiloxane copolymer blocking with trimethylsiloxane groups at both ends of the molecular chain, a dimethylpolysiloxane blocking with dimethylvinylsiloxane groups at both ends of the molecular chain, a methyl vinylpolysiloxane blocking with dimethylvinylsiloxane groups at both ends of the molecular chain, a dimethylsiloxane-methylvinylsiloxane copolymer blocking with dimethylvinylsiloxane groups at both ends of the molecular chain, a dimethylsiloxane-methylvinylsiloxane-methylphenylsiloxane copolymer blocking with dimethylvinylsiloxane groups at both ends of the molecular chain, an organopolysiloxane copolymer comprising a siloxane unit represented by $R^1{}_2SiO_{2/2}$ and a siloxane unit represented by $R^1{}_2R^2SiO_{1/2}$ and a siloxane unit represented by $SiO_{4/2}$, an organopolysiloxane copolymer comprising a siloxane unit represented by $R^1{}_2R^2SiO_{1/2}$ and a siloxane unit represented by $SiO_{4/2}$, an organopolysiloxane copolymer comprising a siloxane unit represented by $R^1R^2SiO_{2/2}$ and a siloxane unit represented by $R^1SiO_{3/2}$ or a siloxane unit represented by $R^2SiO_{3/2}$, and a mixture of two or more of the foregoing, but is not limited thereto. Here, $R^1$ is a hydrocarbon group other than an alkenyl group, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group, or a 3,3,3-trifluoropropyl group, and the like. In addition, here, $R^2$ is an alkenyl group, which may be, specifically, a vinyl group, an allyl group, a butenyl group, a pentenyl group, a hexenyl group or a heptenyl group, and the like.

In the addition-curable silicone composition, the (2) organopolysiloxane may serve to crosslink the (1) organopolysiloxane. In the (2) organopolysiloxane, the bonding position of the hydrogen atom is not particularly limited, which may be, for example, bonded to the end and/or side chain of the molecular chain. Also, in the (2) organopolysiloxane, the kind of substituents that may be included in addition to the silicon-bonded hydrogen atom is not particularly limited, which may include, for example, an alkyl group, an aryl group, an aralkyl group or a halogen-substituted alkyl group, and the like as mentioned in the (1) organopolysiloxane, and among these, a methyl group or a phenyl group is usually applied, but is not limited thereto.

The molecular structure of the (2) organopolysiloxane is not particularly limited, and may also have any shape, such as linear, branched, cyclic, reticulated, or linear with partially branched. One having a linear molecular structure among such molecular structures is usually applied, but is not limited thereto.

A more specific example of the (2) organopolysiloxane may include a methylhydrogenpolysiloxane blocking with trimethylsiloxane groups at both ends of the molecular chain, a dimethylsiloxane-methylhydrogen copolymer blocking with trimethylsiloxane groups at both ends of the molecular chain, a dimethylsiloxane-methylhydrogensiloxane-methylphenylsiloxane copolymer blocking with trimethylsiloxane groups at both ends of the molecular chain, a dimethylpolysiloxane blocking with dimethylhydrogensiloxane groups at both ends of the molecular chain, a dimethylsiloxane-methylphenylsiloxane copolymer blocking with dimethylhydrogensiloxane groups at both ends of the molecular chain, a methylphenylpolysiloxane blocking with dimethylhydrogensiloxane groups at both ends of the molecular chain, an organopolysiloxane copolymer comprising a siloxane unit represented by $R^1{}_3SiO_{1/2}$, a siloxane unit represented by $R^1{}_2HSiO_{1/2}$ and a siloxane unit represented by $SiO_{4/2}$, an organopolysiloxane copolymer comprising a siloxane unit represented by $R^1{}_2HSiO_{1/2}$ and a siloxane unit represented by $SiO_{4/2}$, an organopolysiloxane copolymer comprising a siloxane unit represented by $R^1HSiO_{2/2}$ and a siloxane unit represented by $R^1SiO_{3/2}$ or a siloxane unit represented by $HSiO_{3/2}$ and a mixture of two or more of the foregoing, but is not limited thereto. Here, $R^1$ is a hydrocarbon group other than an alkenyl group, which may be, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group or a 3,3,3-trifluoropropyl group, and the like.

The content of the (2) organopolysiloxane is not particularly limited as long as it is included to the extent that appropriate curing can be performed. For example, the (2) organopolysiloxane may be contained in an amount of 0.5 to 10 silicon-bonded hydrogen atoms per one alkenyl group contained in the (1) organopolysiloxane as described above. In such a range, curing can be sufficiently performed and heat resistance can be secured.

The addition-curable silicone composition may further comprise platinum or a platinum compound as a catalyst for curing. The specific type of this platinum or platinum compound is not particularly limited. The ratio of the catalyst may also be adjusted to a level that proper curing may be performed.

In addition, the addition-curable silicone composition may also comprise an appropriate additive required from the viewpoint of improving storage stability, handling properties and workability in an appropriate ratio.

In another example, the silicone composition may comprise, as a condensation-curable silicone composition, for example, (a) an alkoxy group-containing siloxane polymer; and (b) a hydroxyl group-containing siloxane polymer.

The (a) siloxane polymer may be, for example, a compound represented by Formula 1 below.

$$R^1_a R^2_b SiO_c(OR^3)_d$$ [Formula 1]

In Formula 1, $R^1$ and $R^2$ each independently represent a hydrogen atom or a substituted or unsubstituted monovalent hydrocarbon group, $R^3$ represents an alkyl group, where when a plurality of $R^1$, $R^2$ and $R^3$ are present, they each may be the same or different from each other, and a and b each independently represent a number of 0 or more and less than 1, a+b represents a number of more than 0 and less than 2, c represents a number of more than 0 and less than 2, d represents a number of more than 0 and less than 4, and a+b+cX2+d is 4.

In the definition of Formula 1, the monovalent hydrocarbon group may be, for example, an alkyl group having 1 to 8 carbon atoms, a phenyl group, a benzyl group or a tolyl group, and the like, where the alkyl group having 1 to 8 carbon atoms may be a methyl group, an ethyl group, a propyl group, an isopropyl group, a butyl group, a pentyl group, a hexyl group, a heptyl group or an octyl group, and the like. Also, in the definition of Formula 1, the monovalent hydrocarbon group may be substituted with a known substituent such as a halogen, an amino group, a mercapto group, an isocyanate group, a glycidyl group, a glycidoxy group or a ureido group.

In the definition of Formula 1, an example of the alkyl group of $R^3$ may include a methyl group, an ethyl group, a propyl group, an isopropyl group or a butyl group, and the like. Among these alkyl groups, a methyl group or an ethyl group, and the like is usually applied, but is not limited thereto.

Among the polymers of Formula 1, a branched or tertiary crosslinked siloxane polymer may be used. Furthermore, in this (a) siloxane polymer, a hydroxyl group may remain within a range that does not impair the object, specifically within a range that does not inhibit the dealcoholization reaction.

The (a) siloxane polymer may be produced, for example, by hydrolyzing and condensing a polyfunctional alkoxysilane or a polyfunctional chlorosilane, and the like. An average technician in this field can easily select an appropriate polyfunctional alkoxysilane or chlorosilane depending on the desired (a) siloxane polymer, and can also easily control the conditions of the hydrolysis and condensation reactions using the same. Meanwhile, in the production of the (a) siloxane polymer, an appropriate monofunctional alkoxy silane may also be used in combination depending on the purpose.

As the (a) siloxane polymer, for example, a commercially available organosiloxane polymer such as Shin-Etsu Silicone's X40-9220 or X40-9225, or GE Toray Silicone's XR31-B1410, XR31-B0270 or XR31-B2733 may be used.

As the (b) hydroxyl group-containing siloxane polymer contained in the condensation-curable silicone composition, for example, a compound represented by the following formula 2 may be used.

[Formula 2]

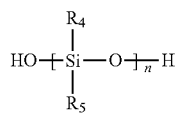

In Formula 2, $R_4$ and $R_5$ each independently represent a hydrogen atom or a substituted or unsubstituted monovalent hydrocarbon group, where when a plurality of $R_4$ and $R_5$ are present, they may be the same or different from each other, and n represents an integer of 5 to 2,000.

In the definition of Formula 2, the specific type of the monovalent hydrocarbon group may include, for example, the same hydrocarbon group as the case of Formula 1 above.

The (b) siloxane polymer may be produced, for example, by hydrolyzing and condensing dialkoxysilane and/or dichlorosilane, and the like. An average technician in this field can easily select an appropriate dialkoxysilane or dichlorosilane according to the desired (b) siloxane polymer, and can also easily control the conditions of the hydrolysis and condensation reactions using the same. As the (b) siloxane polymer as above, a commercially available bifunctional organosiloxane polymer, such as GE Toray Silicone's XC96-723, YF-3800 or YF-3804, and the like may be used.

The above-described addition-curing or condensation-curing silicone composition is an example of a material for forming the silicone pressure-sensitive adhesive or adhesive applied in the present disclosure. That is, basically, all silicone pressure-sensitive adhesives or adhesives known as OCA or OCR, and the like in the industry can be applied in the present disclosure.

The type of the pressure-sensitive adhesive or adhesive or the curable composition forming the same is not particularly limited, which may be appropriately selected according to the intended use. For example, a solid, semi-solid or liquid pressure-sensitive adhesive or adhesive or curable composition may be used. The solid or semi-solid pressure-sensitive adhesive or adhesive or curable composition may be cured before the adhesion object is bonded. The liquid pressure-sensitive adhesive or adhesive or curable composition is referred to as a so-called optical clear resin (OCR), which may be cured after the adhesion object is bonded. According to one example, as the pressure-sensitive adhesive or adhesive or curable composition, a so-called polydimethyl siloxane-based pressure-sensitive adhesive or adhesive or curable composition or polymethylvinyl siloxane-based pressure-sensitive adhesive or adhesive or curable composition or alkoxysilicone-based pressure-sensitive adhesive or adhesive or curable composition may be used, without being limited thereto.

The thickness of the pressure-sensitive adhesive layer or adhesive layer is not particularly limited, which may be selected in an appropriate range for securing a desired adhesion or cohesion. The thickness may be in the range of approximately 1 μm to 50 μm. In another example, the thickness may be 2 μm or more, 3 μm or more, 4 μm or more, 5 μm or more, 6 μm or more, 7 μm or more, 8 μm or more, 9 μm or more, or 10 μm or more, or may also be 45 μm or less, 40 μm or less, 35 μm or less, 30 μm or less, 25 μm or less, 20 μm or less, 15 μm or less, or 10 μm or less or so.

The initial orientation of the liquid crystal compound formed by the pressure-sensitive adhesive layer or adhesive layer and/or the liquid crystal alignment film in the liquid crystal layer, which is a light modulation layer, may be vertical orientation, horizontal orientation, oblique orientation or spray orientation. Also, in the vertical orientation, horizontal orientation, oblique orientation or spray orientation state, the liquid crystal compound may or may not be twisted to exist in twisting orientation or cholesteric orientation. Here, the initial orientation means orientation in a state where an external signal such as a voltage is not applied to the light modulation layer comprising the liquid crystal compound.

The meaning of the horizontal orientation, oblique orientation, vertical orientation or spray orientation is as known in the art. While the liquid crystal compound of the light modulation layer maintains the horizontal orientation, oblique orientation, vertical orientation or spray orientation state in the initial state, it can be changed to the other orientation states according to an external signal.

In one example, the initial orientation of the liquid crystal compound in the light modulation layer may be vertical orientation or an orientation state similar to the vertical orientation. This orientation state is obtained by applying a vertical alignment film as the liquid crystal alignment film. This orientation is useful in an element that implements a so-called R-TN (reversed twisted nematic) orientation.

The in-plane phase difference (based on a wavelength of 550 nm) of the light modulation layer in the vertical orientation or an orientation state similar to the vertical orientation may be, for example, about 30 nm or less, 25 nm or less, 20 nm or less, 15 nm or less, 10 nm or less, or 5 nm or less, or may be 0 nm or more, or more than 0 nm.

The in-plane phase difference may be obtained according to Equation 1 above.

The light modulation film layer may further comprise a spacer for maintaining an interval between the first and second substrates. As the spacer, a ball spacer, a column spacer or a partition wall spacer, which is a spacer that is commonly applied, may be applied. In a suitable example, the partition wall spacer may be used as the spacer, and in particular, the partition wall spacer in which the partition walls form at least one closed figure may be applied. As the closed figure formed by the partition wall spacer, a hexagon (e.g., a regular hexagon) or a quadrangle (e.g., a square or a rectangle) may be exemplified. The partition wall spacer in which the closed figure is a hexagon, particularly a regular hexagon, is also called a so-called honeycomb type spacer. Such a honeycomb or quadrangular partition wall spacer means a case where the figure formed by the partition wall spacer is a honeycomb or quadrangle when the form of the partition wall spacer formed on a substrate is observed in the normal direction of the substrate, as is known. The honeycomb type may usually include a combination of a regular hexagon, and the quadrangle may include a square, a rectangle or a combination of a square and a rectangle, and the like. A partition wall spacer may be used as the spacer in consideration of attachment force between the first and second substrates, without being limited thereto.

The pitch of the spacer may also be appropriately selected in consideration of the desired adhesion or cell gap maintaining efficiency, and the like. For example, when the partition spacer is applied, the pitch of the partition spacer may be in a range of 50 μm to 2,000 μm. The method of obtaining the pitch in the partition spacer is known. For example, if the partition spacer is a honeycomb type, the pitch is obtained through the interval of opposite sides in the hexagon forming the honeycomb, and in the case of a tetragon, the pitch is obtained through the length of the sides of the tetragon. In the case where the intervals of the sides facing each other in the hexagon forming the honeycomb or the lengths of the sides of the tetragon are not constant, an average value of them may be defined as the pitch.

When the partition wall spacer constitutes a closed figure, for example, the area of the closed figure (i.e., the area of, for example, the hexagon or the quadrangle) may be, for example, in a range of about 1 to 200 mm2. When a plurality of closed figures is formed by the partition wall spacers and the closed figures have different areas, the area is an arithmetic mean value.

The line width of the partition spacer, for example, the width of each wall of the hexagon forming the honeycomb, or the tetragon, may be in a range of, for example, about 5 μm to 50 μm. In another example, the line width may be about 10 μm or more, or 15 μm or more, or may also be 45 μm or less, 40 μm or less, 35 μm or less, 30 μm or less, 25 μm or less, or 20 μm or less or so.

In the above range, the cell gap may be properly maintained, and adhesion between substrates may also be maintained excellently.

A method of forming the ball spacer, column spacer or partition spacer as above between substrates is known.

As a component for applying an external signal to the light modulation layer, an electrode layer may be formed on each substrate of the light modulation film layer. For example, the electrode layer may be present between the first surface and the pressure-sensitive adhesive or adhesive layer in the first substrate (between 100 and 1001 in FIG. 2) and/or between the first surface and the alignment film in the second substrate (between 200 and 2001 in FIG. 2) (if a spacer is present, between the spacer and the alignment film). In the case of the second substrate, it is common that first, an electrode layer is formed on the first surface, and a spacer and an alignment film are formed thereon sequentially, so that when a spacer is present, the electrode layer may be located between the first surface of the second substrate and the spacer and alignment film.

As the electrode layer, a known transparent electrode layer may be applied, and for example, a so-called conductive polymer layer, a conductive metal layer, a conductive nanowire layer, or a metal oxide layer such as ITO (indium tin oxide) may be used as the electrode layer. Besides, various materials and forming methods capable of forming a transparent electrode layer are known, which can be applied without limitation.

The light modulating device may comprise other additional constitutions as necessary, while basically comprising the light modulation film layer. That is, depending on the driving mode, the implementation of the above-described transparent, black, high reflection and/or low reflection mode and switching between them are possible even with the light modulation film layer alone, but in order to facilitate the implementation or switching of these modes, it is also possible to include additional components.

For example, the device may further comprise a polarization layer (passive polarization layer) disposed on one side or both sides of the light modulation film layer. FIG. 3 is, as an example of the above structure, the case where in the structure of FIG. 2, the polarization layer (400) is disposed only on one side of the light modulation film layer, and FIG. 4 is the case where in the structure of FIG. 2, the polarization layer (400) is disposed on both sides of the light modulation film layer. In addition, when the partition spacer is applied as the spacer and the shape is a tetragon (square or rectangle), the sides of the tetragon and the absorption axis of the polarization layer are suitably disposed to be substantially vertical or horizontal to each other.

The term polarization layer may mean an element that converts natural light or unpolarized light into polarized light. In one example, the polarization layer may be a linear polarization layer. The linear polarization layer means a case where the selectively transmitting light is linearly polarized light that vibrates in any one direction and the selectively absorbing or reflecting light is linearly polarized light that vibrates in directions orthogonal to the vibration direction of the linearly polarized light. That is, the linear polarization layer may have a transmission axis and absorption axes or reflection axes orthogonal to each other in the plane direction.

The polarization layer may be an absorptive polarization layer or a reflective polarization layer. As the absorptive polarization layer, for example, a polarization layer in which iodine is dyed to a polymer stretched film such as a PVA stretched film, or a guest-host polarization layer in which liquid crystals polymerized in an oriented state are used as a host and dichroic dyes arranged along the orientation of the liquid crystals are used as a guest may be used, without being limited thereto.

As the reflective polarization layer, for example, a reflective polarization layer known as a so-called DBEF (dual brightness enhancement film) or a reflective polarization layer formed by coating a liquid crystal compound such as LLC (lyotropic liquid crystal) may be used, but is not limited thereto.

As shown in FIG. 4, it may have a structure in which the polarization layers are disposed on both sides of the light modulation film layer. In this case, the angle formed by the transmission axes of the polarization layers disposed on both sides may be in the range of 85 degrees to 95 degrees, or approximately perpendicular.

The light modulating device may comprise other necessary constitutions in addition to the above constitutions. For example, any other constitution necessary for driving or using the light modulating device, such as a pressure-sensitive adhesive layer or adhesive layer for attaching other components in addition to the pressure-sensitive adhesive layer or adhesive layer which may be formed on the first surface of the first substrate, a hard coating film, an antireflection film and/or an NIR (near-infrared) cut layer, may be added.

A method of manufacturing the light modulating device is not particularly limited, and the device may be manufactured through a known method except that the above elements are applied as each component.

The present disclosure also relates to an automobile comprising the light modulating device. In the automobile of the present disclosure, such a light modulating device is included in a sunroof or glass. Here, as shown in FIG. 1, the glass may be the front glass (100), the side glass (200) or the rear glass (300) of the vehicle. In addition, the sunroof (400) formed only in a partial region on the ceiling of the vehicle is illustrated in FIG. 1, but the form of the sunroof of the present disclosure is not limited to that illustrated in FIG. 1, and for example, also includes a design in which a significant part of the vehicle's ceiling is made up of the sunroof. Furthermore, the light modulating device of the present disclosure may constitute the sunroof or the vehicle glass as a whole, or may form a part thereof.

In the automobile of the present disclosure, when the light modulating device comprises an anisotropic substrate as the above-described substrate in the structure as described above, the optical axis of the substrate in the case of the sunroof may be parallel to the width direction (that is, the dotted line direction exemplarily indicated in FIG. 1) of the automobile. In addition, in the case of vehicle glass, the optical axis of the substrate may be parallel to the ground direction (that is, as indicated by the dotted line in FIG. 1, the direction that the automobile is parallel to the ground in a state where its four wheels are in contact with the ground, or the longitudinal direction of the automobile) of the substrate.

According to such a structure, the front or movement direction of the passenger's gaze is matched with the optical axis direction of the substrate of the light modulating device, or the like, whereby optical non-uniformity that may appear through the disclosure of the anisotropic substrate can be improved or eliminated while taking advantages of the substrate.

A method of configuring such an automobile is not particularly limited, and a method of constructing a sunroof or glass of an automobile is generally adopted, but the process proceeds so that the above-described arrangement may be achieved in consideration of the optical axis direction of the light modulating device upon the construction.

Other methods of implementing the automobile of the present disclosure are not particularly limited, and a known method may be applied.

Effects of Invention

The present disclosure can provide a light modulating device comprising an anisotropic plastic substrate and an automobile in which the light modulating device is applied to a sunroof and/or glass, and can provide an automobile capable of eliminating or improving disadvantages due to application of the anisotropic plastic substrate, while taking advantages of the light modulating device.

MODE FOR INVENTION

Hereinafter, the present disclosure will be described in detail through Examples, but the scope of the present disclosure is not limited by Examples below.

Preparation Example 1. Manufacturing of Light Modulating Device (A)

As first and second substrates, a polyester film (SKC, highly stretched PET, in-plane phase difference (based on a wavelength of 550 nm): about 10,000 nm) with a thickness of about 145 μm or so, in which an ITO (indium tin oxide) layer was deposited on each first surface to a thickness, was used. A horizontal photo-alignment film (AMP21, LG Chem, norbornene series) was formed on each surface of the ITO layers of the first and second substrates. At this time, when the alignment film was formed on the surface of the ITO layer of the second substrate, ball spacers having an average diameter (D50 diameter) of about 12 μm were dispersed in the alignment film material, so that the thickness (cell gap) of the liquid crystal layer in the final product was maintained by the ball spacers. The orientation of the photo-alignment film was performed by irradiation of linearly polarized ultraviolet rays, and the orientation of the liquid crystal compound by the photo-alignment film was performed to be approximately horizontal with the slow axis of the substrate. Subsequently, a liquid crystal composition (MDA-14-1235, manufactured by Merck) comprising a dichroic dye was coated on the alignment film of the second substrate, and a light modulation film layer was manufactured by laminating the surface of the first substrate, on which the alignment film was formed, with the coated side of the liquid crystal composition so as to face each other. Subsequently, an absorptive linear polarization layer of PVA (poly(vinyl alcohol)) series was attached to one side of the light modulation film layer to manufacture a light modulating device. At the time of the attachment, the absorption axis of the linear polarization layer and the slow axis of the substrate were made to be horizontal to each other.

Example 1 and Comparative Example 1

The non-uniformity of light transmittance was evaluated by applying the light modulating device (A) of Preparation Example 1 to a sunroof of an automobile.

A surface light source was disposed on the rear surface of the light modulating device, the light modulating device was mounted at a sunroof position of the vehicle so that the slow axis of the substrate in the device was parallel to the width of the vehicle, and then the non-uniformity in the case of moving the gaze to the left and right while observing from the front was evaluated (Test 1).

A surface light source was disposed on the rear surface of the light modulating device, the light modulating device was mounted at a sunroof position of the vehicle so that the slow axis of the substrate in the device was perpendicular to the width of the vehicle, and then the non-uniformity in the case of moving the gaze to the left and right while observing from the front was evaluated (Test 2).

Test 1 above corresponds to Example 1, and Test 2 corresponds to Comparative Example 1.

FIGS. 5 to 7 are cases of observing the front, left and right, respectively, in Test 1 above, and FIGS. 8 to 10 are cases of observing the front, left and right, respectively, in Test 2 above.

As in the figures, in the case of Test 1, the uniform transmittance was maintained as in the case of frontal observation even when the observer's gaze moved, but in the case of Test 2, the transmittance deviation for each region occurred according to the movement of the observer's gaze, so that the optical uniformity was not ensured.

Preparation Example 2. Manufacturing of Light Modulating Device (B)

As a first substrate, a polyester film (SKC, highly stretched PET, in-plane phase difference (based on a wavelength of 550 nm): about 10,000 nm) having a thickness of about 145 μm or so, in which an ITO (indium tin oxide) layer was deposited on the first surface to a thickness, was used. A pressure-sensitive adhesive layer was formed on the first surface of the first substrate. A silicone pressure-sensitive adhesive composition (Shinetsu, KR3700) was bar-coated and dried at about 150° C. or so for 5 minutes to form the pressure-sensitive adhesive layer to a thickness of 10 μm or so. As a second substrate, the same substrate as the first substrate was applied. First, as honeycomb type partition wall spacers, partition wall spacers in which the regular hexagon (closed figure) constituting the honeycomb had a pitch of about 350 μm or so, a height (cell gap) of about 6 μm or so and a line width of about 10 μm or so were formed on the ITO layer of the second substrate with an area ratio of about 9%, and a vertical alignment film (5661LB3, Nissan) was formed on the formed spacers. The vertical alignment film was formed by rubbing it in one direction. Subsequently, a liquid crystal composition was coated on the surface of the vertical alignment film of the second substrate, and a light modulation film layer was manufactured by laminating the pressure-sensitive adhesive layer of the first substrate with the coated side of the liquid crystal composition so as to face each other. As the liquid crystal composition, a composition formulated by mixing a liquid crystal compound (MAT-19-1261, manufactured by Merck) with a chiral dopant (S811, manufactured by Merck) to implement a pitch of approximately 20 μm or so, was used. Subsequently, two absorptive linear polarization layers of PVA (poly(vinyl alcohol)) series were attached to both sides of the light modulation film layer to manufacture a light modulating device. At the time of the attachment, the absorption axis of the linear polarization layer and the slow axis of the substrate were made to be perpendicular or horizontal to each other, and the absorption axes between the two polarization layers were made to be perpendicular to each other.

Example 2 and Comparative Example 2

The non-uniformity of light transmittance was evaluated by applying the light modulating device (A) of Preparation Example 2 to a sunroof of an automobile.

A surface light source was disposed on the rear surface of the light modulating device, the light modulating device was mounted at a sunroof position of the vehicle so that the slow axis of the substrate in the device was parallel to the width of the vehicle, and then the non-uniformity in the case of moving the gaze to the left and right while observing from the front was evaluated (Test 3).

A surface light source was disposed on the rear surface of the light modulating device, the light modulating device was mounted at a sunroof position of the vehicle so that the slow axis of the substrate in the device was perpendicular to the width of the vehicle, and then the non-uniformity in the case of moving the gaze to the left and right while observing from the front was evaluated (Test 4).

Test 3 above corresponds to Example 2, and Test 4 corresponds to Comparative Example 2.

FIGS. 11 to 13 are cases of observing the front, left and right, respectively, in Test 3 above, and FIGS. 14 to 16 are cases of observing the front, left and right, respectively, in Test 4 above.

As in the figures, in the case of Test 3, the uniform transmittance was maintained as in the case of frontal observation even when the observer's gaze moved, but in the case of Test 4, the transmittance deviation for each region occurred according to the movement of the observer's gaze, so that the optical uniformity was not ensured.

The invention claimed is:

1. An automobile comprising a sunroof having a light modulating device disposed therein, the sunroof disposed in the automobile, the light modulating device comprising:
   a light modulation film layer,
   wherein the light modulation film layer comprises:
   a first anisotropic substrate;
   a second anisotropic substrate; and
   a liquid crystal layer,
   wherein each of the first and second anisotropic substrates has a first surface,
   wherein the first surfaces of the first and second anisotropic substrates face each other;
   wherein the liquid crystal layer is disposed between the first surfaces of the first and second anisotropic substrates,
   wherein a slow axis of the first or second anisotropic substrate is disposed parallel to a width direction of the automobile,
   wherein the light modulating device further comprises a fastening portion by which the light modulating device is installed in the sunroof of the automobile, or the light modulating device has a same shape as the sunroof,
   wherein each of the first and second anisotropic substrate has an in-plane phase difference, calculated by Equation 1 below, of 400 nm or more,
   wherein the light modulating device further comprises two polarization layers disposed on opposite sides of the light modulation film layer and the absorption axes between the two polarization layers are perpendicular to each other, $$Rin = d \times (nx - ny) \quad \text{[Equation 1]}$$

wherein in Equation 1, Rin is the in-plane phase difference, d is a thickness of a substrate, nx is a refractive index of a substrate in a slow axis direction, ny is a refractive index of a substrate in a fast axis direction.

2. The automobile according to claim 1, wherein the slow axes of the first and second anisotropic substrates are parallel to each other.

3. The automobile according to claim 1, further comprising:
liquid crystal alignment films are present on each of the first surfaces of the first and second anisotropic substrates.

4. The automobile according to claim 1, wherein a pressure-sensitive adhesive layer or an adhesive layer is present on the first surface of the first anisotropic substrate, and a liquid crystal alignment film is present on the first surface of the second anisotropic substrate.

5. The automobile according to claim 1, wherein the liquid crystal layer comprises a liquid crystal compound and a chiral dopant.

6. The automobile according to claim 1, wherein the absorption axis of each of the two polarization layers and the slow axis of the first or second anisotropic substrate are perpendicular or horizontal to each other.

7. An automobile comprising front, rear, or side glass having a light modulating device disposed therein, the front, rear, or side glass disposed in the automobile, the light modulating device comprising:
a light modulation film layer,
wherein the light modulation film layer comprises:
a first anisotropic substrate;
a second anisotropic substrates; and
a liquid crystal layer,
wherein each of the first second anisotropic substrates has a first surface,
wherein the first surfaces of the first and second anisotropic substrates face each other,
wherein the liquid crystal layer is disposed between the first surfaces of the first and second anisotropic substrates,
wherein a slow axis of the first or second anisotropic substrate is disposed parallel to a longitudinal direction of the automobile,
wherein the light modulating device further comprises a fastening portion by which the light modulating device is installed in the front, rear or side glass of the automobile, or the light modulating device has a same shape as the front, rear or side glass,
wherein each of the first and second anisotropic substrate has an in-plane phase difference, calculated by Equation 1 below, of 400 nm or more,
wherein the light modulating device further comprises two polarization layers disposed on opposite sides of the light modulation film layer and the absorption axes between the two polarization layers are perpendicular to each other, $$Rin = d \times (nx - ny) \quad \text{[Equation 1]}$$

wherein in Equation 1, Rin is the in-plane phase difference, d is a thickness of a substrate, nx is a refractive index of a substrate in a slow axis direction, ny is a refractive index of a substrate in a fast axis direction.

8. The automobile according to claim 7, wherein the slow axes of the first and second anisotropic substrates are parallel to each other.

9. The automobile according to claim 7, further comprising:
liquid crystal alignment films are present on each of the first surfaces of the first and second anisotropic substrates.

10. The automobile according to claim 7, wherein a pressure-sensitive adhesive layer or an adhesive layer is present on the first surface of the first anisotropic substrate, and a liquid crystal alignment film is present on the first surface of the second anisotropic substrate.

11. The automobile according to claim 7, wherein the liquid crystal layer comprises a liquid crystal compound and a chiral dopant.

12. The automobile according to claim 7, wherein the absorption axis of each of the two polarization layers and the slow axis of the first or second anisotropic substrate are perpendicular or horizontal to each other.

* * * * *